US009872233B2

(12) United States Patent
Jeon et al.

(10) Patent No.: US 9,872,233 B2
(45) Date of Patent: Jan. 16, 2018

(54) DEVICES AND METHOD FOR RETRIEVING AND UTILIZING NEIGHBORING WLAN INFORMATION FOR LTE LAA OPERATION

(71) Applicant: Intel IP Corporation, Santa Clara, CA (US)

(72) Inventors: Jeongho Jeon, San Jose, CA (US); Huaning Niu, Milpitas, CA (US); Seunghee Han, Cupertino, CA (US); Qinghua Li, San Ramon, CA (US); Hwan-Joon Kwon, Santa Clara, CA (US)

(73) Assignee: Intel IP Corporation, Santa Clara, CA (US)

(*) Notice: Subject to any disclaimer, the term of this patent is extended or adjusted under 35 U.S.C. 154(b) by 181 days.

(21) Appl. No.: 14/670,769

(22) Filed: Mar. 27, 2015

(65) Prior Publication Data
US 2015/0351115 A1    Dec. 3, 2015

Related U.S. Application Data

(60) Provisional application No. 62/006,743, filed on Jun. 2, 2014, provisional application No. 62/027,141, filed on Jul. 21, 2014.

(51) Int. Cl.
*H04W 72/12* (2009.01)
*H04W 48/16* (2009.01)
(Continued)

(52) U.S. Cl.
CPC ........... *H04W 48/16* (2013.01); *H04W 16/14* (2013.01); *H04W 24/02* (2013.01); *H04W 72/02* (2013.01); *H04W 72/12* (2013.01); *H04W 84/12* (2013.01)

(58) Field of Classification Search
CPC ..... H04W 48/16; H04W 84/12; H04W 24/02; H04W 72/12
(Continued)

(56) References Cited

U.S. PATENT DOCUMENTS

2007/0249352 A1* 10/2007 Song ...................... H04L 63/08
                                                            455/436
2011/0222523 A1    9/2011 Fu et al.
(Continued)

FOREIGN PATENT DOCUMENTS

CN         106256146 A      12/2016
WO    WO-2015187565 A1    12/2015

OTHER PUBLICATIONS

"International Application Serial No. PCT/US2015/033549, International Preliminary Report on Patentability dated Dec. 15, 2016", 9 pgs.

(Continued)

Primary Examiner — Sam Bhattacharya
(74) Attorney, Agent, or Firm — Schwegman Lundberg & Woessner, P.A.

(57) ABSTRACT

A License Assisted Access (LAA) enhanced NodeB (eNB), user equipment (UE) and communication methods therebetween operating in a Long Term Evolution unlicensed band (LTE-U) are generally described. The eNB may transmit a request to the UE for information regarding a Wireless Local Area Network (WLAN) over which the UE may be able to communicate. The WLAN information may include an LTE-U channel and time window for reporting. The UE may obtain the WLAN information through communication with an access point (AP). Measurement information of the LTE-U channel may also be obtained by or on behalf of the UE. The UE may transmit the WLAN information to the eNB. The eNB may use the WLAN information or submit the WLAN information to a network entity to perform
(Continued)

channel selection, UE grouping or localization, appointing delegate UEs to perform channel sensing or scheduling UEs in a same group or proximity.

25 Claims, 3 Drawing Sheets

(51) Int. Cl.
*H04W 16/14* (2009.01)
*H04W 84/12* (2009.01)
*H04W 72/02* (2009.01)
*H04W 24/02* (2009.01)

(58) Field of Classification Search
USPC .................. 455/450, 454; 370/235, 331, 350
See application file for complete search history.

(56) References Cited

U.S. PATENT DOCUMENTS

| | | |
|---|---|---|
| 2013/0235861 A1 | 9/2013 | Balasubramanian et al. |
| 2014/0010086 A1* | 1/2014 | Etemad ................ H04W 16/14 370/235 |

OTHER PUBLICATIONS

"International Application Serial No. PCT/US2015/033549, International Search Report dated Sep. 24, 2015", 5 pgs.

"International Application Serial No. PCT/US2015/033549, Written Opinion dated Sep. 24, 2015", 7 pgs.

"Reply Liaison on WLAN signal measurements for WLAN/3GPP Radio interworking", R2-142731, 3GPP TSG RAN WG2 Meeting #86, Seoul Republic of Korea, (May 23, 2014).

"3rd Generation Partnership Project; Technical Specification Group Radio Access Network; Study on Wireless Local Area Network (WLAN) — 3GPP radio interworking (Release 12)", 3GPP TR 37.834 V1.3.0, '3GPP; TSGRAN; (Release 12)', [Online]. Retrieved from the Internet: <http://www.3gpp.org/ftp/Specs/archive/37_series/37.834/ >, (Feb. 26, 2014), 17 pgs.

"Korean Application Serial No. 10-2016-7030305, Notice of Preliminary Rejection dated Jul. 20, 2017", Without English Translation, 9 pgs.

"Korean Application Serial No. 10-2016-7030305, Response Filed Sep. 19, 2017 to Notice of Preliminary Rejection dated Jul. 20, 2017", (W/ English Claims), 28 pgs.

* cited by examiner

DEVICES AND METHOD FOR RETRIEVING AND UTILIZING NEIGHBORING WLAN INFORMATION FOR LTE LAA OPERATION

PRIORITY CLAIM

This application claims the benefit of priority to U.S. Provisional Patent Application Ser. No. 62/027,141, filed Jul. 21, 2014, and entitled "METHOD FOR RETRIEVING AND UTILIZING NEIGHBORING WLAN INFORMATION FOR LTE LAA OPERATION" and to U.S. Provisional Patent Application Ser. No. 62/006,743, filed Jun. 2, 2014, and entitled "[3GPP RAN1/2] CHANNEL SELECTION FOR LTE-U BASED ON UE MEASUREMENTS," each of which is incorporated herein by reference in its entirety.

TECHNICAL FIELD

Embodiments pertain to radio access networks. Some embodiments relate to determining usage in unlicensed spectrums.

BACKGROUND

Long Term Evolution (LTE) networks operate in a number of specific frequency bands and deliver a wide variety of information to an ever-increasing number and type of user equipment (UE). Typically, the use of different communication techniques is limited to licensed bands regulated by the federal government. The growth of network use has sparked an interest in expanding LTE use beyond these licensed bands. LTE-Unlicensed (LTE-U) allows License Assisted Access (LAA) communication devices such as UEs and evolved node Bs (eNBs) to make use of unlicensed spectrum in communications. While only LTE systems are able to legally operate in LTE bands, other systems, such as Wireless Local Area Network (WLAN) systems, coexist with LTE-U systems in the unlicensed spectrum. In particular, WLAN systems using IEEE 802.11a/n/ac technologies have enjoyed widespread use in the 5 GHz Unlicensed National Information Infrastructure (U-NII) bands by both individuals and operators for a variety of purposes.

Typically, unlicensed band users operate on one channel (sub-band) rather than occupying the entire spectrum, making it possible for multiple users to coexist by using different channels. Due to coexistence of communications in the unlicensed band, it would be desirable to determine spectrum usage in the unlicensed band to better provide LAA communications in the unlicensed band.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
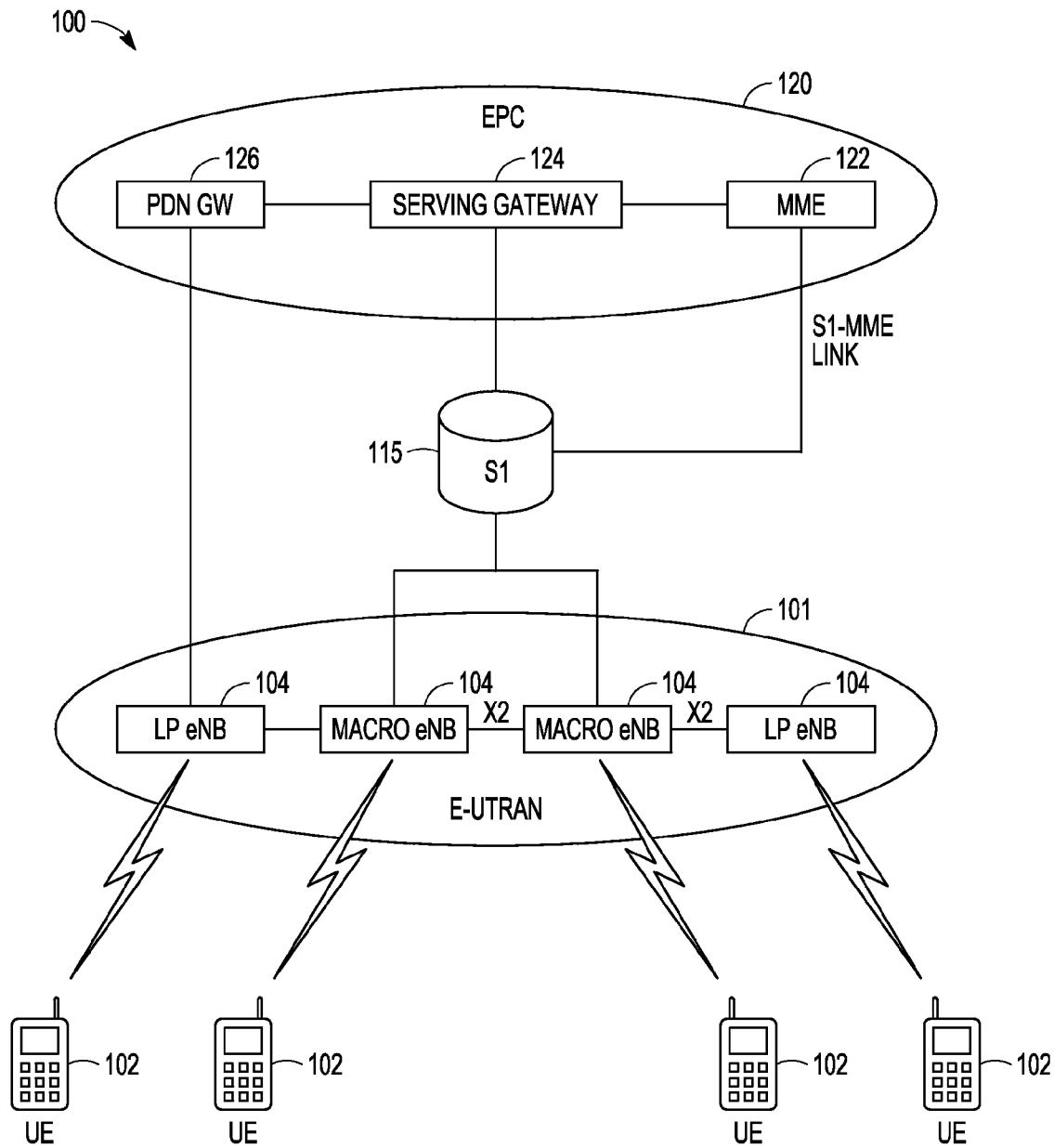
FIG. 1 shows an example of a portion of an end-to-end network architecture of an LTE network with various components of the network in accordance with some embodiments.

FIG. 1 shows an example of a portion of an end-to-end network architecture of a Term evolution (LTE) network with various components of the network in accordance with some embodiments. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 may include mobility management entity (MME) 122, serving gateway (serving GW) 124, and packet data network gateway (PDN GW) 126. The RAN includes enhanced node Bs (eNBs) 104 (which may operate as base stations) for communicating with user equipment (UE) 102. The eNBs 104 may include macro eNBs and low power (LP) eNBs.

The MME 122 may be similar in function to the control plane of legacy Serving GPRS Support Nodes (SGSN). The MME may manage mobility aspects in access such as gateway selection and tracking area list management. The serving GW 124 may terminate the interface toward the RAN 101, and route data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 may terminate an SGi interface toward the packet data network (PDN). The PDN GW 126 may route data packets between the EPC 120 and the external PDN, and may be a key node for policy enforcement and charging data collection. The PDN GW 126 may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) may terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. The S1 interface 115 may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells may be used to extend coverage to indoor areas where outdoor signals do not reach well, or to add network capacity in areas with very dense phone usage, such as train stations. As used herein, the term low power (LP) eNB may refer to any suitable relatively low power eNB for implementing a narrower cell (narrower than a macro cell) such as a femtocell, a picocell, or a microcell. Femtocell eNBs may be typically provided by a mobile network operator to its residential or enterprise customers. A femtocell may be typically the size of a residential gateway or smaller and generally connect to the user's broadband line. Once plugged in, the femtocell may connect to the mobile operator's mobile network and provide extra coverage in a range of typically 30 to 50 meters for residential femtocells. Thus, an LP eNB might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which contains ten 1 ms subframes. Each subframe, in turn, may contain two slots of 0.5 ms. Each slot may contain 6-7 symbols, depending on the system used. A resource block (RB) (also called physical resource block (PRB)) may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block. In Frequency Division Duplexed (FDD) mode, both the uplink and downlink frames may be 10 ms and may be frequency (full-duplex) or time (half-duplex) separated. In Time Division Duplexed (TDD), the uplink and downlink subframes may be transmitted on the same frequency and may be multiplexed in the time domain. A downlink resource grid may be used for downlink transmissions from an eNB to a UE. The grid may be a time-frequency grid, which is the physical resource in the downlink in each slot. Each column and each row of the resource grid may correspond to one OFDM symbol and one OFDM subcarrier, respectively. The duration of the resource grid in the time domain may correspond to one slot. The smallest time-frequency unit in a resource grid may be denoted as a resource element. Each resource grid may comprise a number of the above resource blocks, which describe the mapping of certain physical channels to resource elements. Each resource block may comprise 12 (subcarriers)*14 (symbols)=168 resource elements.

There may be several different physical downlink channels that are conveyed using such resource blocks. Two of these physical downlink channels may be the physical down link control channel (PDCCH) and the physical downlink shared channel (PDSCH). Each subframe may be partitioned into the PDCCH and the PDSCH. The PDCCH may normally occupy the first two symbols of each subframe and carry, among other things, information about the transport format and resource allocations related to the PDSCH channel, as well as H-ARQ information related to the uplink shared channel. The PDSCH may carry user data and higher-layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that tell the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and may be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 2:
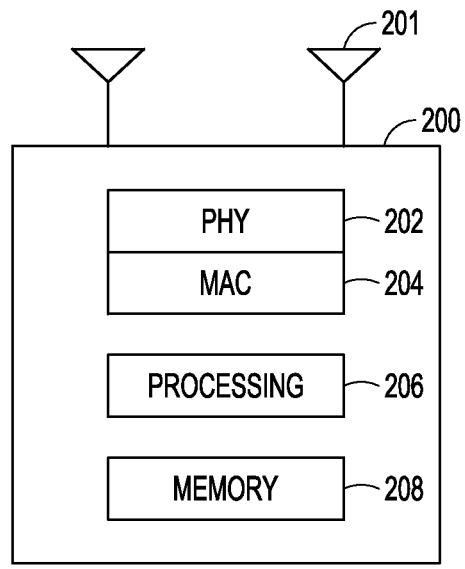
FIG. 2 illustrates a functional block diagram of a communication device in accordance with some embodiments.

FIG. 2 illustrates a functional block diagram of a communication device (e.g., an UE or eNB) in accordance with some embodiments. The communication device 200 may include physical layer (PHY) circuitry 202 for transmitting and receiving radio frequency electrical signals to and from the communication device, other eNBs, other UEs or other devices using one or more antennas 201 electrically connected to the PHY circuitry. The PHY circuitry 202 may include circuitry for modulation/demodulation, upconversion/downconversion, filtering, amplification, etc. Communication device 200 may also include medium access control layer (MAC) circuitry 204 for controlling access to the wireless medium and to configure frames or packets for communicating over the wireless medium. The communication device 200 may also include processing circuitry 206 and memory 208 arranged to configure the various elements of the cellular device to perform the operations described herein. The memory 208 may be used to store information for configuring the processing circuitry 206 to perform the operations.

In some embodiments, the communication device 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), sensor, or other device that may receive and/or transmit information wirelessly. In some embodiments, the communication device 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the communication device 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $\frac{1}{10}$ of a wavelength or more.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 206 may be configured to receive OFDM communication signals over a multicarrier communication channel in accordance with an OFDMA communication technique. The OFDM signals may comprise a plurality of orthogonal subcarriers. In some broadband multicarrier embodiments, the cellular device 200 may operate as part of a broadband wireless access (BWA) network communication network, such as a Worldwide Interoperability for Microwave Access (WiMAX) communication network or a $3^{rd}$ Generation Partnership Project (3GPP) Universal Terrestrial Radio Access Network (UTRAN) or a Long-Term-Evolution (LTE) communication network or an LTE-Advanced communication network or a fifth generation (5G) LTE communication network or a high speed downlink/uplink access (HSDPA/HSUPA) communication network, although the scope of the invention is not limited in this respect.

As noted above, as the demand for communicating data (e.g., voice and video) continues to increase, a RAN may experience increasingly heavy communication traffic. This can lead to adverse network effects such as reduced data rates. To alleviate network traffic on the licensed spectrum, network capacity can be added by providing communication capability to the RAN devices from networks that operate using a communication spectrum not licensed for use by the cellular network devices. Communication peaks may occur locally and the RAN serving the locality may experience peak demand. The locality may include a neighboring Wireless Local Area Network (WLAN) such as an IEEE 802.11 network including a WiFi network. However, because the WLAN network operates in an unlicensed band, availability and characteristics of the channels operating in the band may be an issue. UEs and eNBs that operate in the unlicensed band in addition to the licensed LTE band may be License Assisted Access (LAA) UEs and LAA eNBs, which are generally referred to herein merely as UEs and eNBs.

To better make use of the unlicensed spectrum, UEs of the RAN may be asked to (or may automatically) determine WLAN information. To this end, in one embodiment the one or more of the UEs may actively take and collect power and interference measurements on one or more channels of the unlicensed band. These measurements, in addition to other information, may be transmitted to, and collected at, the eNBs serving the UEs. Using this information, the RAN of which the eNBs are a part may be able to obtain characteristics of the WLAN network operating in the unlicensed band and make operating decisions in the unlicensed band for both the eNBs and UEs based on these characteristics. For example, the eNB may be able to determine from the collected measurement information the amount of interference at any point within the geographical region and select the best channel(s) for the UEs to use to maximize performance metrics. If the measurements of multiple UE are collected throughout the desired area, spatial metrics such as area spectral efficiency throughout all geographical areas of the network may be determined through interpolation. Area spectral efficiency is a measure of the quantity of users or services that can be simultaneously supported by the channel in a defined geographic area and is defined as the maximum aggregated throughput (summed over all UEs in the system) divided by the channel bandwidth.

However, in some embodiments, one or more of the UEs served by a particular eNB may not take actual measurements of the network characteristics, or may supplement other, less computationally intensive information that is used by the LTE system in optimizing network performance with the above measurements. To achieve this, the system described herein may exploit information already available in the WLAN without requiring measurements being taken by the UE or requiring modification to the exiting LTE system measurement and/or reporting procedure. In one embodiment, the WLAN information provided by the UE to the eNB may be contained in a WLAN management frame, such as a beacon frame, periodically broadcasted from an access point (AP). The WLAN management frame may announce the presence of the AP and contain, for example, a timestamp (for synchronization), a Basic Service Set Identifier (BSSID), BSS Load, capability, and data rates supported. In another embodiment, the WLAN information may include information defined for the WLAN Measurement Report. The information defined for the WLAN Measurement Report may include a Clear Channel Access (CCA) report, a Received Power Indicator (RPI) histogram report, a Channel Load report, and a Noise Histogram report. The UE may itself perform radio measurements for the reports in the WLAN Measurement Report or may request other UEs in the same BSS to perform measurements on behalf of the UE based on the radio measurement capability advertised by the UEs in the WLAN management frames.

In one embodiment, the UE may obtain the desired WLAN information and transmit the WLAN information to the eNB. The eNB, in one embodiment, may collect the WLAN information from one or more UEs, process the collected information and submit the processed information to a network entity where the processed information may be used in controlling network operations involving use of the LTE unlicensed band by the UEs. The network operations may include channel selection by the eNB among multiple candidate channels. By selecting a channel that is less populated by existing WLAN systems for the LTE operation, both systems may enjoy a cleaner channel environment. In addition, the serving eNB may want to assign a newly joined UE to an eNB operating over a channel in which the corresponding UE is expected to experience relatively less WLAN interference. The WLAN information can also be used for UE grouping/localization, which may enable group sensing and scheduling for the UEs. The information can be further forwarded to a network entity for association, hand-over, cell frequency hopping, power control, and CCA adaptation.

Figure 3:
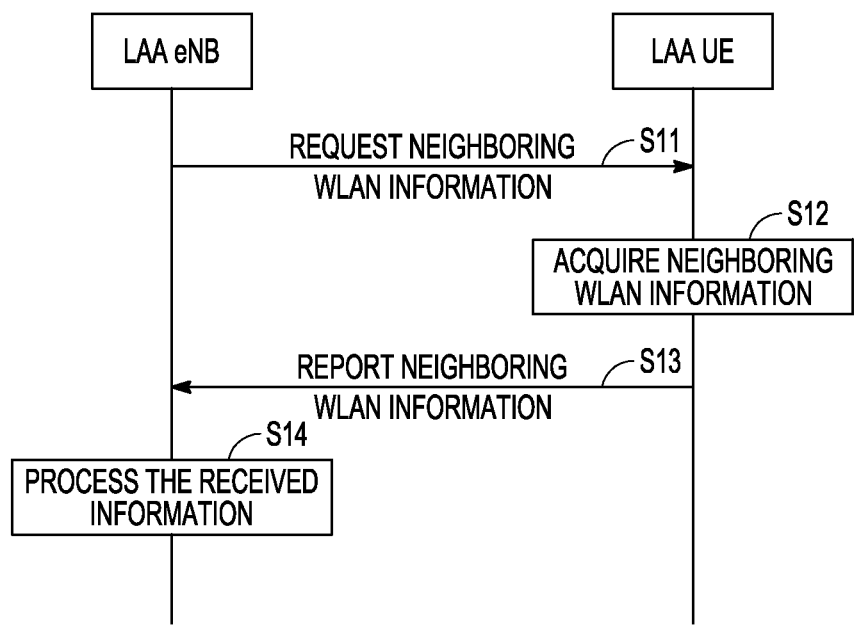
FIG. 3 illustrates a message flow of a method of obtaining and using WLAN information in accordance with some embodiments.
Figure 4:
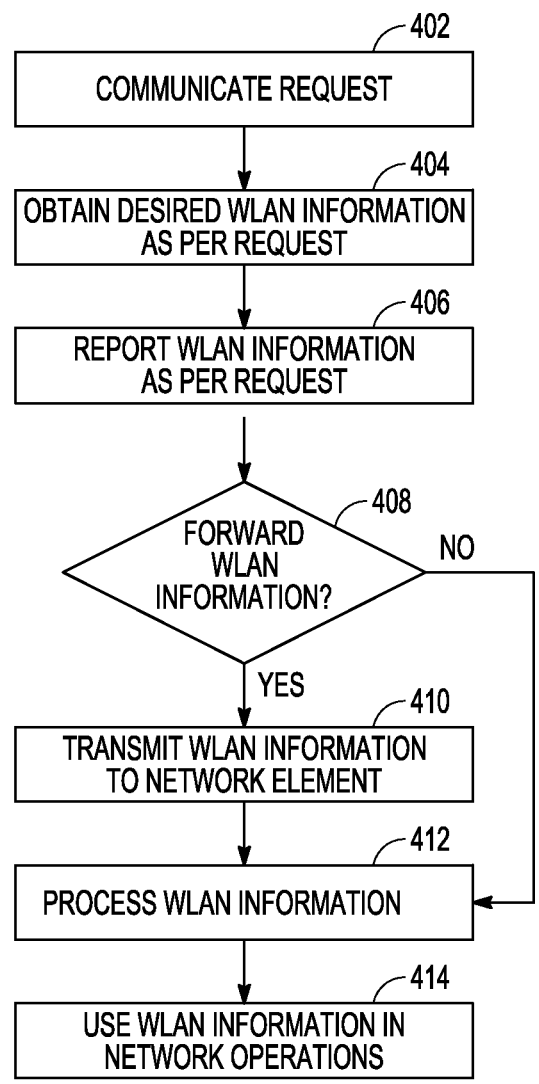
FIG. 4 illustrates a flowchart of a method of obtaining and using WLAN information in accordance with some embodiments.

FIG. 3 illustrates a message flow of a method of obtaining and using WLAN information in accordance with some embodiments. FIG. 4 illustrates a flowchart of a method of obtaining and using WLAN information in accordance with some embodiments. As shown in FIGS. 3 and 4, the eNB may send a request for neighboring WLAN information to one or more UEs (S11 in FIG. 3, step 402 in FIG. 4). Each of the one or more UEs may have a WiFi transceiver to be able to communicate with one or more APs.

The UEs that have received the request from the eNB may obtain the WLAN information (S12 in FIG. 3, step 404 in FIG. 4). In one embodiment, the WLAN information may be obtained by the UE directly. In one embodiment, the UE may obtain the information from a beacon signal without performing any measurement. In one embodiment, the UE may obtain the information by performing one or more measurements on a WLAN signal. In one embodiment, the UE may obtain the information indirectly through from a proxy device that may measure or otherwise obtain the WLAN information and provide the WLAN information to the UE.

Each UE that has obtained the WLAN information then may generate a report containing the WLAN information and transmit the report to the eNB that sent the request (S13 in FIG. 3, step 406 in FIG. 4). In one embodiment, the reports from the UEs may be transmitted to the eNB as specified by the eNB. In one embodiment, the reports from the UEs may be transmitted to the eNB as specified by the eNB in the request. In one embodiment, the reports from each UE may be transmitted to the eNB in any available uplink transmission for the UE.

The eNB may collect the reported WLAN information and determine whether to send the WLAN information to a network entity, such as an MME, to make network operation decisions involving the eNB and other eNBs (step 408 in FIG. 4). In one embodiment, the eNB may collect the reported WLAN information in a single report. In one embodiment, the eNB may organize the WLAN information from different UEs into different WLAN categories, for example, APs, power level, or interference level. In one embodiment, the eNB may organize the WLAN information into different reports for each category or UE.

If the eNB at step 408 decides that the collected WLAN information is to be sent to the network entity, at step 410 in FIG. 4, the eNB may forward the collected WLAN information to the network entity. In one embodiment, the eNB may forward the collected WLAN information to the network entity in a single report. In one embodiment, the collected WLAN information from different UEs may be organized into different WLAN categories. In one embodiment, the WLAN information may be transmitted to the network entity in different reports.

Regardless of whether the eNB forwards the collected WLAN information to the network entity, the eNB may process the collected WLAN information (S14 in FIG. 3, step 412 in FIG. 4). In one embodiment, the eNB may process the collected WLAN information by determining interference for each of a plurality of channels in the LTE unlicensed band. In one embodiment, the eNB may process the collected WLAN information by determining load for each of a plurality of channels in the LTE unlicensed band.

The eNB may subsequently use the WLAN information in making network operation decisions involving the eNB at step 414 in FIG. 4. In one embodiment, the eNB may select a channel in the LTE unlicensed band that is less populated by the WLAN. In one embodiment, the eNB may assign a new UE to an eNB operating over the selected channel. In one embodiment, the eNB may determine UE grouping or localization to enable group sensing and scheduling for LTE UEs. In one embodiment, the eNB may transmit a message appointing a UE as a delegate for another UE in the same group or proximity to perform channel sensing on behalf of the other UE. In one embodiment, the eNB may indicate to the UE to send the report in response to predetermined triggering conditions being met and a duration over which reports are to be sent to the eNB.

More specifically, the eNB may transmit a request for the WLAN information to at least one UE that is served by the eNB. In one embodiment, the eNB may transmit the request to all UEs. In one embodiment, the eNB may target only a subset of the UEs. The subset may be determined based on the location of the UEs within the geometric area served by the eNB. For example, the eNB may transmit the request only to UEs known by the eNB to have a WiFi transceiver (whether or not the transceiver is currently active). The eNB may acquire information regarding whether a particular UE has a WiFi transceiver from a Radio Resource Control (RRC) message, such as an RRC Connection Request, transmitted from the particular UE to the eNB. In another embodiment, the eNB may initially select UEs that are known to be located a predetermined minimum distance from each other (e.g., via the Global Positioning System (GPS), or have a highly correlated list of APs that the UEs are able to access or have a similar amount of interference), and/or target only UEs moving slowly enough so that the WLAN information is valid for a predetermined minimum amount of time. The request may specify communication aspects of the WLAN measurement and reporting, such as a specific channel or channels over which the UE is to communicate with the APs and a time window for which the WLAN information is requested.

The request from the eNB may also contain information about the APs operating over the specified channel or channels. For example, the eNB may include in the request the beacon schedules of APs in the spatial area served by the eNB and perhaps in the specific area in which the UE is disposed (as determined by GPS). Each beacon schedule may include one or more of the channel index, rough beacon start time, and BSSID of the associated AP. The BSSID is the MAC address of the AP. The eNB may direct the UE in the request to use a Probe Request message in interacting with the AP to obtain the WLAN information. The UE, in response, may probe the specified APs directly using channel index and BSSID to obtain the WLAN information, quickly generate the report, and transmit the report to the requesting eNB.

As above, the request from the eNB may be sent to one or more UEs having a WiFi transceiver. The eNB may transmit the request via a WiFi transceiver using standard WiFi measurement frames. However, the eNB itself may not have a WiFi transceiver. In this case, the request may be transmitted to the UEs via LTE signaling, for example, L1/L2 Physical Downlink Control Channel (PDCCH), Media Access Control Control Element (MAC-CE), a Radio Resource Control (RRC) signaling over a licensed or unlicensed channel, or any other higher layer signaling.

The request may include a request for a number of different types of WLAN information. The WLAN information may include the BSSID, information contained in the WLAN management frame body and/or measurement information defined for the WLAN Measurement Report (Table 8-81 of IEEE 802.11-2012). In particular, the WLAN management frame body may include a beacon frame body, for example, that contains (Table 8-20 of IEEE Std 802.11-2012): Timestamp, Beacon interval, Capability, SSID, Supported rates, Frequency-hopping (FH) Parameter Set; Direct-Sequence (DS) Parameter Set; Contention-Free (CF) Parameter Set; independent basic service set (IBSS) Parameter Set; Traffic Indication Map (TIM), Country, FH Parameters, FH Pattern Table, Power Constraint, Channel Switch Announcement, Quiet, IBSS DFS, Transmit Power Control (TPC) Report, effective radiated power (ERP), Extended Supported Rates, RSN, BSS Load, EDCA Parameter Set, Quality of Service (QoS) Capability, AP Channel Report, BSS Average Access Delay, Antenna, BSS Available Admission Capacity, BSS AC Access Delay, Measurement Pilot Transmission, Multiple BSSID, RM Enabled Capabilities, Mobility Domain, DSE registered location, Extended Channel Switch Announcement, Supported Operating Classes, HT Capabilities, HT Operation, 20/40 BSS Coexistence, Overlapping BSS Scan Parameters, Extended Capabilities, Field Management System (FMS) QoS Traffic Capability, Time Advertisement, Interworking, Advertisement Protocol, Roaming Consortium, Emergency Alert Identifier, Mesh ID, Mesh Configuration, Mesh Awake, Beacon Timing, mesh coordination function coordinated channel access opportunity (MCCAOP) Advertisement Overview, MCCAOP Advertisement, Mesh Channel Switch Parameters, and Vendor Specific information. This disclosure, however, is not limited to WLAN information such as that provided above. Relevant WLAN information defined in future technology releases such as IEEE 802.11ax may be requested and reported using the techniques described herein.

Probe Response frame body (Table 8-27 of IEEE Std 802.11-2012), for example, may contain the information contained in the Beacon frame body except TIM, QoS Capability, FMS Descriptor, and Mesh Awake. The Probe Response frame body may additionally include Channel Usage, Time Zone, and Mesh Awake Window information. Although it is not listed here, any information contained in any WLAN management frame including Association Response, Reassociation Response, Authentication, and Deauthentication can be requested by the eNB.

The measurement information defined for WLAN Measurement Report may include a number of reports. The basic report may indicate a detection of a valid MAC Protocol Data Unit (MPDU), OFDM preamble, unidentified signal (which is not characterized as radar, an OFDM preamble, or a valid MPDU), and radar. The Clear Channel Assessment (CCA) report may provide the fractional duration over which CCA indicated the channel was busy during the measurement duration. The received power indicator (RPI) histogram report may contain the RPI densities observed in the channel for the eight RPI levels defined in Table 8-82 of IEEE Std 802.11-2012. The channel load report may contain the proportion of measurement duration for which the measuring UE determined the channel to be busy. The noise histogram report may contain the idle power indicator (IPI) densities observed in the channel for the eleven IPI levels defined in Table 8-84 of IEEE Std 802.11-2012. The beacon report may include, for example, the received channel power indicator (RCPI) of the Beacon, Measurement Pilot, or Probe Response frame, the received signal to noise indicator (RSNI) for the Beacon, Measurement Pilot, or Probe Response frame, and the BSSID from the Beacon, Measurement Pilot, or Probe Response frame being reported. The frame report may include the Transmitter Address, number of frames received from this transmitter, average RCPI for these frames, and BSSID of the transmitter. The STA statistics report may return groups of values for STA counters and for BSS Average Access Delay. The STA counter group values may include transmitted fragment counts, group addressed transmitted frame counts, failed counts, retry counts, multiple retry counts, frame duplicate counts, Request to Send (RTS) success counts, RTS failure counts, Acknowledgement (ACK) failure counts, received fragment counts, group addressed received frame counts, FCS error counts, and transmitted frame counts. BSS Average Access Delay group values may include AP average access delay, average access delay for each access category, associated STA count, and channel utilization. The LCI report may return a requested location in terms of latitude, longitude, and altitude. The LCI report may include types of altitude such as floors and permit various reporting resolutions. The transmit stream/category measurement report may provide the transmit-side performance metrics for the measured traffic stream. Other reports may include the multicast diagnostics report, location Civic report and location identification report.

As above, the request from the eNB may specify one or more specific channels of interest, a time window for which the WLAN information is requested, and the WLAN information. Once the request has been transmitted to a UE, the UE may acquire the neighboring WLAN information indicated in the request using the WiFi transceiver of the UE. In one embodiment, the WLAN information may include the BSSID of an AP. The UE, via the WiFi transceiver, may already have captured BSSID and stored in memory a list of APs whose beacons the UE can receive on the channel or channels specified in the request. In other embodiments in which the WiFi transceiver has not yet been activated or the UE does not store the AP list, the UE may turn on the WiFi transceiver and/or sequentially tune to each specified channel to collect the BSSID of the AP. The BSSID may be contained in the WLAN MAC frame. In an aggregated MAC service data unit (A-MSDU), the Address 3 field of the data frame always carries the BSSID. In a MSDU, the Address 1, Address 2, and Address 3 field carries the BSSID when the To DS and From DS pair in Frame Control are set to (1,0), (0,1), and (0,0), respectively. In the management frame, the BSSID may be contained in the octet before the sequence control.

To acquire the WLAN information, the UE may first identify the management frame type containing the requested information specified in the request from the eNB.

In some embodiments, the WLAN information may be able to be obtained by the UE passively by listening to messages, such the beacon signal, from the AP. In this case, the UE may collect the information by extracting the data in the corresponding field of the frame over the specified time window. In other embodiments, however, the UE may take a more active role. In particular, the UE may determine that the requested WLAN information may be obtained by sending a request message to the AP and receiving a response message from the AP containing the WLAN information. In other embodiments, the UE itself may not make this determination—instead the request from the eNB may indicate to the UE to transmit the request message to APs whose beacons the UE is able to receive. The types of messages that can be exchanged between the UE and the eNB include Probe Request/Probe Response messages, Association Request/Association Response and Reassociation Request/Reassociation Response frames.

In another embodiment, the UE may determine that the request contains a request for information defined for the WLAN Measurement Report. In this case, measurements may be completed prior to the UE sending the WLAN information in the response to the eNB. There are several ways that the UE may obtain the measurement information. In one embodiment, the UE itself may perform the measurements on the specified channel or channels. In another embodiment, the UE may request one or more other communication devices able to communicate via the WLAN and in the same BSS to perform measurements on its behalf Such WLAN devices may include LTE UEs having WLAN modem. Such a request can be sent to a WLAN device that has advertised a radio measurement capability using the RM Enabled Capabilities element in a management frame. As above, the radio measurement capability may be advertised in a message such as a beacon, Association Request, Association Response, Reassociation Request, Reassociation Response, or Probe Response. The RM Enabled Capabilities element may indicate whether the corresponding capability listed in Table 8-119 in IEEE Std 802.11-2012 is enabled which includes Link Measurement, Neighbor Report, Parallel Measurements, Repeated Measurements, Beacon Passive Measurement, Beacon Active Measurement, Beacon Table Measurement, Beacon Measurement Reporting Conditions, Frame Measurement, Channel Load Measurement, Noise Histogram Measurement, Statistics Measurement, LCI Measurement, LCI Azimuth, Transmit Stream/Category Measurement, Triggered Transmit Stream/Category Measurement, AP Channel Report, RM MIB, Measurement Pilot Transmission Information, Neighbor Report TSF Offset, RCPI Measurement, RSNI Measurement, BSS Average Access Delay, BSS Available Admission Capacity, and Antenna capability.

The UE may collect the information listed in the request and generate a report containing the WLAN information. The report may be organized per channel if the request indicates that multiple channels are requested. The report on each channel may contain information about multiple BSSIDs if the UE can receive multiple beacons from different APs over the channel. In addition, if some of the WLAN information is unable to be collected, the UE can indicate the inability to collect the WLAN information in the report.

In different embodiments, the report may be generated and/or sent to the requesting eNB under different circumstances. For example, the report may be sent passively, the gathering of the WLAN information and transmission of the report being triggered in response to the UE receiving the request. The gathering of the WLAN information and transmission of the report may also be established by the eNB via the request but triggered only when certain conditions are met. The triggering conditions may be, for example, changes in the neighboring WLAN information such as the set of BSSIDs whose beacons that the UE can overhear or changes in the advertised BSS Load level beyond a predetermined threshold. In response to the triggering conditions being satisfied, the UE may proactively generate the report and sends the report to the eNB. The triggering conditions and the time duration over which the proactive reporting is requested in this case may be set by the request from the eNB. The report may be transmitted at the end of the time window provided by the request. Alternatively, the report may be updated regularly, either being transmitted from the UE to the eNB as soon as one of the conditions changes in the predetermined manner or at predetermined time intervals within the time window. In some embodiments, a complete report may be provided in a transmission or alternatively only information that has changed by a predetermined amount from the prior transmission may be provided in the report.

If the LTE LAA eNB does not have WiFi transceiver, the report message can be signaled to the LTE LAA eNB via, for example, L1/L2 (PDCCH), MAC CE, RRC signaling, or any other higher layer signaling. If LTE LAA eNB have WiFi transceiver, the report message can be either signaled via, for example, L1/L2 (PDCCH), MAC CE, RRC signaling, or any other higher layer signaling or signaled using normal WiFi measurement frames. In other embodiments, even though the LTE LAA eNB has a WiFi transceiver, the report messages may still be signaled via L1/L2, MAC CE, RRC signaling. This decision may be made by the LTE LAA eNB depending, for example, on known traffic or interference levels.

As above, the report (in addition to the request) may be transmitted over WiFi if the eNB has a WiFi transceiver. As above, however, regardless of whether the eNB has WiFi transceiver, the report may be transmitted to the eNB via, for example, L1/L2 Physical Downlink Control Channel (PDCCH), Media Access Control Control Element (MAC-CE), a Radio Resource Control (RRC) signaling over a licensed or unlicensed channel, or any other higher layer signaling. If the request or response is not sent over WiFi, the communication between the eNB and UE can take place over either a licensed or unlicensed channel. The request may specify the manner, e.g., the channel and transmission technology, in which the report is to be provided to the eNB. The manner in which the request is transmitted to the UE from the eNB may be the same as or different than the manner in which the report is transmitted from the eNB to the UE. For example, the request may be sent via L1/L2 PDCCH and the response via an RRC message, or the request may be sent via WiFi and the response via a MAC-CE message.

The report may provide the eNB with information regarding the dynamically changing environment of the UEs. Once the report from the UE is received at the eNB, the eNB may process the WLAN information by, e.g., extracting the WLAN information from the report and determining the manner in which to use the WLAN information. In one embodiment, the WLAN information may be used by the eNB in channel selection. In particular, the eNB may collect BSSID information from all of the UEs from which a response to the request of the eNB has been received. In particular, if a number of the UEs report different BSSIDs (APs) operating at a particular channel, the eNB may avoid selecting the channel during channel selection. If the eNB is capable of operating over multiple channels, the eNB may differentiate the serving channel or channels to each UE based on the BSSID information provided by the UEs by selecting a channel or channels that are less crowded (i.e., have less usage) and/or have less interference.

BSSID may not be the only information used for channel selection. Other information contained in WLAN management frame or information defined for WLAN Measurement Report can also be used for channel selection. For example, additional information such as BSS Load, BSS Average Access Delay, CCA report, or Channel load report may aid in channel selection in addition to or instead of the BSSIDs. For example, even if few UEs report BSSIDs operating at a particular channel, eNB may not select the particular channel in response to extracting the above additional information in the WLAN report indicating that the channel is heavily used by the existing WLAN systems. Note that in processing the WLAN information, the eNB may also make further determinations based on the WLAN information. For example, the UEs may not provide a complete picture of the interference levels over the entire geographical range served by an eNB. However, the eNB may be able to interpolate interference levels at geographical locations between the UEs using standard interpolation techniques in conjunction with the WLAN information provided by the UEs in the reports.

In another embodiment, the eNB may use the WLAN information to determine UE grouping or localization. As above, the eNB may collect BSSID information from all of the UEs from which a response to the request of the eNB has been received. If the WLAN information from a number of UEs indicates a highly correlated set of BSSIDs, the eNB may group the UEs together. In other words, the mere existence of the same sets of BSSIDs being reported by different UEs may indicate that the UEs are proximate to each other (as they are able to capture exactly the same or mostly the same BSSIDs from APs). The correlation itself may indicate that the UEs suffer similar WiFi interference. Similarly, additional location-related information may be available and used instead of or in addition to the BSSID correlation information. The additional location-related information may include, e.g., a LCI report. The eNB may utilize either or both sets of information to provide a more precise localization of the UEs than that provided by GPS, for example.

The eNB may use the UE grouping/localization information, to promote energy conservation among the UEs. More specifically, after determining that a particular set of UEs is grouped together (i.e., located geographically proximate to each other), the eNB may appoint one or more delegate UEs from the group of UEs to perform functions for the entire group of UEs. For example, if the eNB requests channel sensing for determining unlicensed band interference, the eNB may appoint the delegate UE(s) to provide the channel sensing on behalf of the other UEs in the group who suffer similar interference. By doing so, the energy consumption for channel sensing by non-delegate UEs can be reduced with negligible to no loss in available information. Moreover, the eNB may balance energy consumption among the UEs in the same group or proximity by periodically rotating which UEs become delegates. The eNB may also decide which UEs become delegates based on the battery status of the UEs. For example, the eNB may provide power information in an initial report or other communication, and the eNB may prioritize delegation to UEs that are connected to a permanent power supply (such as being plugged into a wall socket) over UEs that are operating on a battery. In other embodiments, the eNB may be periodically updated with the battery characteristics of the UEs and accordingly update delegation. The eNB may schedule multiple UEs in the same group or proximity.

In another embodiment, instead of or in addition to the eNB processing the WLAN information collected from the UEs, the eNB may forward the collected WLAN information to a network entity, such as an MME. The network entity may also collect the reports and/or other information directly from the UEs for various network applications. The network entity may control the eNBs and/or UEs in applications such as association of the UE with a particular eNB, hand-over of a UE from one eNB to another, cell frequency hopping of the eNBs and/or UEs, power control of the eNBs and/or UEs, and CCA adaptation of the eNBs and/or UEs.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A License Assisted Access (LAA) enhanced NodeB (eNB) comprising:
a transceiver configured to communicate with an LAA user equipment (UE) operating in an unlicensed band; and
processing circuitry configured to:
configure the transceiver to transmit a request to the LE for Wireless Local Area Network (WLAN) information regarding a WLAN over which the UE is able to communicate, the WLAN information comprising information about the unlicensed band including at least one channel in the unlicensed band and a time window for which the WLAN information is requested, the request further comprising information about an access point (AP) operating over the channel, the information of the AP comprising at least one of:
a beacon schedule of the AP including channel index, rough beacon start time, or
basic service set identification (BSSID) of the AP;
configure the transceiver to receive, from the LE, a report including the WLAN information; and
set network operations involving use of the unlicensed band by the eNB based on the WLAN information.

2. The eNB of claim 1, wherein:
the processing circuitry further configured cause the transceiver to submit the WLAN information to a network entity to use the WLAN information in setting network operations involving use of the unlicensed band by UEs.

3. The eNB of claim 1, wherein the WLAN information comprises at least one of:
information that is obtainable by the UE without measurement, or
information from a measurement performable by or on behalf of the UE.

4. The eNB of claim 1, wherein:
the band is a Long Term Evolution (LTE) unlicensed band, and
in setting the network operations, the processing circuitry is further configured to:
select a channel in the LTE unlicensed band, from among a plurality of candidate channels, that is less populated by the WLAN, the WLAN information including at least one of Basic Service Set (BSS) Load, BSS average access delay, clear channel assessment (CCA) report, or channel load report for each of the candidate channels; and
configure the transceiver to communicate with the UE using the selected channel.

5. The eNB of claim 1, wherein:
the band is a Long Term Evolution (LTE) unlicensed band, and
in setting the network operations, the processing circuitry is further configured to:
determine, from the WLAN information, WLAN interference for each of a plurality of channels in the LTE unlicensed band; and
select, from among the plurality of channels, a channel comprising a lower amount of WLAN interference; and
assign a new UE to an eNB operating over the selected channel.

6. The eNB of claim 1, wherein:
the band is a Long Term Evolution (LTE) unlicensed band, and
the processing circuitry is further configured to, based on the WLAN information determine UE grouping or localization to enable group sensing and scheduling for LTE UEs, the determination based on reports from a plurality of UEs indicating a highly correlated set of basic service set identifications (BSSIDs).

7. The eNB of claim 6, wherein the processing circuitry is further configured to, based on the determination:
configure the transceiver to transmit a message to one of the plurality of UEs appointing the one of the plurality of UEs as a delegate for another of the plurality of UEs in the same group or proximity suffering from unlicensed band interference to perform channel sensing on behalf of the other of the plurality of UEs.

8. The eNB of claim 1, wherein the request at least one of:
indicates to the UE to send the report in response to the request; or
indicates to the UE to send the report in response to predetermined triggering conditions being met and a duration over which reports are to he sent to the eNB, the predetermined triggering conditions including changes in the neighboring WLAN information including basic service set identifications (BSSIDs) whose beacons the UE can overhear or an advertised BSS load level.

9. The eNB of claim 1. wherein the WLAN information comprises at least one of:
the BSSID;
information in a WLAN management frame body;
information defined for a WLAN Measurement Report.

10. The eNB of claim 1, further comprising:
an antenna configured to transmit communications between the transceiver and the UE.

11. A License Assisted Access (LAA) user equipment (UE) comprising:
a transceiver configured to communicate with an LAA enhanced NodeB (eNB) using an unlicensed band; and
processing circuitry configured to:
configure the transceiver to receive a request from the eNB for Wireless Local Area Network (WLAN) information regarding a neighboring WLAN with which the UE is able to communicate, the request specifying a manner for which the WLAN information is to be obtained;
configure the transceiver obtain the WLAN information through communication with an access point (AP) on a channel of the unlicensed band using the specified manner; and
configure the transceiver to transmit a report including the WLAN information to the eNB, and configure the transceiver to transmit a request for a station in the same basic service set (BSS) to perform measurements on behalf of the UE and transmit resulting measurement information to the UE.

12. The UE of claim 11, further comprising:
a WiFi module configured to communicate with a plurality of APs, wherein the processing circuitry is further configured to:
   determine a list of APs whose beacons the UE is able to receive on the specified channel;
   configure the transceiver to tune to the specified channel to sequentially collect the basic service set identifications (BSSIDs) of the APs using the beacons of the APs, and
   configure the transceiver to transmit to the eNB the BSSIDs of the APs in the report.

13. The UE of claim 11, wherein:
the UE identifies a management frame type comprising the WLAN information specified in the request from the eNB.

14. The UE of claim 11, wherein:
the request specifies a time window for which the WLAN information is requested, and
the processing circuitry is further configured to:
   extract the WLAN information in a field of a frame over the specified time window.

15. The UE of claim 11, wherein the processing circuitry is further configured to:
configure the transceiver obtain the WLAN information by sending one of a Probe Request, Association Request, or Reassociation Request to the AP and respectively receiving one of a Probe Response, Association Response or Reassociation Response message.

16. The UE of claim 11, wherein the processing circuitry is further configured to:
configure the transceiver to perform a radio measurement on the channel.

17. A non-transitory computer-readable storage medium that stores instructions for execution by one or more processors of a License Assisted Access (LAA) enhanced NodeB (eNB) to configure the eNB to communicate via a transceiver with an LAA user equipment (UE) operating in an unlicensed band, the one or more processors to configure the eNB to:
transmit a request to the UE for Wireless Local Area Network (WLAN) information regarding a neighboring WLAN with which the UE is able to communicate, the WLAN information comprising information available in a WLAN management frame or from a response message sent in response to a request message sent by the UE to an access point (AP) operating over a channel in the unlicensed band;
configure the transceiver to receive, from the UE, a report including the WLAN information, and
configure the transceiver to submit the WLAN information to a network entity for use in network operations involving use of the unlicensed band by UEs,
wherein the request transmitted to the UE from the transceiver comprises information about the AP including at least one of:
   a beacon schedule of the AP including channel index, rough beacon start time, or
   basic service set identification (BSSID) of the AP.

18. The non-transitory computer-readable storage medium of claim 17, wherein:
the WLAN information further comprises measurement information performable by or on behalf of the UE.

19. The non-transitory computer-readable storage medium of claim 17, wherein:
the band is a Long Term Evolution (LTE) unlicensed band, and
the instructions further configure the processing circuitry to, based on the WLAN information.
   select a channel in the LTE unlicensed band, from among a plurality of candidate channels, which is less populated by the WLAN or has a lower amount of WLAN interference, and
   assign a new UE to an eNB operating over the selected channel.

20. The non-transitory computer-readable storage medium of claim 17, wherein the request at least one of:
indicates to the UE to send the report in response to the request; or
indicates to the UE to send the report in response to predetermined triggering conditions being met and a duration over which reports are to he sent to the eNB, the predetermined triggering conditions including changes in the neighboring WLAN information including BSSIDs whose beacons the UE can overhear or an advertised BSS load level.

21. A method for retrieving neighboring Wireless Local Area Network (WLAN) information at a License Assisted Access (LAA) enhanced NodeB (eNB) from a LAA user equipment (UE) in an unlicensed band, the method comprising:
transmitting a request for the WLAN information from the eNB to the UE, the request specifying at least one of a channel in the unlicensed band and a time window for which the WLAN information is to be obtained;
receiving the WLAN information from the UE at the eNB, the WLAN information comprising operational information of the unlicensed band for which measurement is not employed; and
setting network operations involving use of the unlicensed band by UEs by at least one of:
   processing the WLAN information at the eNB to set the network operations, or
   submitting the WLAN information to a network entity for the network entity to set the network operations,
wherein the request indicates to the UE at least one of to acquire:
   a WLAN basic service set identifier (BSSID) from WLAN Media Access Control (MAC) frames,
   information in a WLAN management frame body from a response to a request to neighboring WLAN access points (APs), and
   information defined for WLAN Measurement Report by one of:
      the UE performing a measurement, or
      the UE requesting a WLAN station to perform a measurement for the UE.

22. The method of claim 21, wherein:
the WLAN information further comprises measurement information obtained by or on behalf of the UE.

23. The method of claim 21, wherein:
the request is transmitted to the UE via one of L1/L2 Physical Downlink Control Channel (PDCCH), Media Access Control Control Element (MAC-CE), or a Radio Resource Control (RRC) signaling over a licensed or unlicensed channel, and
the request is transmitted to the UE via a WiFi measurement frame.

24. The method of claim 21, wherein the request indicates to the UE to at least one of:

generate a report comprising the WLAN information passively in response to the request, trigger generation of a report comprising the WLAN information when a predetermined condition is met even in the absence of a request from the eNB, transmit a report comprising the WLAN information to the eNB via L1/L2(PDCCH), MAC CE, RRC signaling, or another higher layer signaling, or transmit a report comprising the WLAN information to the eNB via WiFi measurement frames.

25. The method of claim 21, further comprising, based on the received WLAN information, at least one of:

channel selection,

UE grouping or localization, appointing delegate UEs to perform channel sensing on behalf of other UEs in a same group or proximity experiencing similar channel conditions, or scheduling a set of UEs in a same group or proximity without additional channel sensing.

* * * * *

UNITED STATES PATENT AND TRADEMARK OFFICE
CERTIFICATE OF CORRECTION

PATENT NO. : 9,872,233 B2  
APPLICATION NO. : 14/670769  
DATED : January 16, 2018  
INVENTOR(S) : Jeon et al.

Page 1 of 1

It is certified that error appears in the above-identified patent and that said Letters Patent is hereby corrected as shown below:

In the Claims

In Column 15, Line 24, in Claim 1, delete "LE" and insert --UE-- therefor

In Column 15, Line 38, in Claim 1, delete "LE," and insert --UE,-- therefor

In Column 16, Line 37, in Claim 8, delete "he" and insert --be-- therefor

In Column 16, Line 43, in Claim 9, delete "claim 1." and insert --claim 1,-- therefor In Column 18, Line 6, in Claim 19, delete "information." and insert --information:-- therefor In Column 18, Line 19, in Claim 20, delete "he" and insert --be-- therefor In Column 19, Line 7, in Claim 24, delete "L1/L2(PDCCH)," and insert --L1/L2 (PDCCH),-- therefor Signed and Sealed this  
Eleventh Day of June, 2019

Andrei Iancu  
*Director of the United States Patent and Trademark Office*